United States Patent [19]

Carter

[11] 4,347,212
[45] Aug. 31, 1982

[54] METHOD FOR FORMING A TIRE

[75] Inventor: Russell W. Carter, Des Moines, Iowa

[73] Assignee: Corn States Metal Fabricators, Inc., West Des Moines, Iowa

[21] Appl. No.: 181,461

[22] Filed: Aug. 26, 1980

[51] Int. Cl.³ .............................................. B29H 5/02
[52] U.S. Cl. ................................... 264/315; 425/43; 425/812
[58] Field of Search ..................... 425/78, 812, 437; 249/66 A, 66 C

[56] References Cited

U.S. PATENT DOCUMENTS

| | | | |
|---|---|---|---|
| 2,904,830 | 9/1959 | Mulrooney | 425/812 X |
| 3,377,662 | 4/1968 | Fukushima | 425/812 X |
| 3,804,566 | 4/1974 | Kimura et al. | 425/812 X |
| 3,842,150 | 10/1974 | Carter | 425/812 X |
| 4,021,168 | 5/1977 | Dailey | 425/812 X |

FOREIGN PATENT DOCUMENTS

| | | | |
|---|---|---|---|
| 1378973 | 10/1964 | France | 425/812 |
| 922788 | 4/1963 | United Kingdom | 425/812 |

Primary Examiner—J. Howard Flint, Jr.
Attorney, Agent, or Firm—Rudolph L. Lowell

[57] ABSTRACT

Separable mold sections of a tire forming machine are brought together to form a tire cavity within which a preformed tire band is expandable against the inner surface of the cavity side wall. During the tire shaping operation, air is forced by the expanding tire band from the cavity and into the atmosphere, through valve controlled air passages having terminal ends open to the cavity side wall. As the expanding tire band moves into conforming engagement with the inner surface of the cavity side wall, the final residual air in the cavity is forced therefrom concurrently with valves at the passage terminal ends being engaged and moved by the expanding tire band to passage closing positions wherein the valves form a smooth surface continuous with the inner surface of the tire cavity.

2 Claims, 7 Drawing Figures

METHOD FOR FORMING A TIRE

BACKGROUND OF THE INVENTION

In the forming of vehicle tires it is desirable that the tire side wall be free of any radially projected rubber pins, impressions or other surface irregularities. The forming of the pins is usually the result of the tire band, in the final forming operation, being forced into the air release passages which have terminal ends open to the inner surface of the tire forming cavity of the molding machine. For economical purposes, the pins are not removed and thus give to the tire an unfinished appearance. The forming of cavities or depressions in the tire wall not only deface the tire but provide pockets for road dirt accumulations. In any event, where vehicles are on display, the pins or side wall blemishes detract not only from the overall appearance of the tire but also from the overall appearance of the vehicle.

Attempts to avoid surface irregularities on the tire side wall have been made particularly with regard to avoiding the necessity and resultant expense of removing the rubber pins from the finished tire. In the case of side wall depressions or the like surface irregularities, such are left untouched and thus permanently deface the finished tire. One attempt to eliminate the rubber pins is shown in British Pat. No. 922,788, issued Apr. 3, 1963, wherein there is disclosed a one piece valve body extended within a mold aperture and movable by an expanding tire band into an aperture closing position. The valve is not movable to a full open position and is apparently limited in operation to horizontally extended apertures so that the depressions formed in the tire tread appear as part of the tread.

In U.S. Pat. No. 4,021,168, bent nails having one or more washers positioned between the nail head and the face of the mold and inserted into the vents or passages of the tire mold. A washer nail prevents rubber protrusions from forming in the vents during molding but allows the escape of air. It is also apparent that the nail head and washer assembly forms depressions over the entire tread and tire side wall surfaces.

The tire forming method of U.S. Pat. No. 3,842,150 provides for the forming of a tire having smooth side walls which are free of any radially protruding rubber pins or surface irregularities. The release of air from the tire cavity through passages, having terminal ends open to the tire cavity side wall, is controlled by valves which are actuated in response to the selective application thereon of air under pressure and sub-atmospheric air. Although this method performs satisfactorily, appreciable time and resultant expense are involved in the forming of the various valve structures and air passages, and the control system for controlling the flow of air through the passages to actuate the valves in synchronisms with the tire forming operation.

SUMMARY OF THE INVENTION

The tire forming method of this invention is readily applicable to present commercially available and existing tire forming machines without requiring any extensive machining of the mold to accommodate the air control valves that are located in air release passages. The valves of this invention are arranged within the air passages such that each valve is yieldably retained in an open position and movable to a closed position, by the expanding tire band, wherein the valve forms a surface continuous with the tire cavity side surface of the mold. The valve is thus positively closed by the expanding tire band and on removal of the formed tire is automatically returned to a normal open position permitting an unobstructed flow of air through the air passages. Machining and operating costs are thus reduced to a minimum along with the elimination of any tire surface irregularities so that the formed tire may be immediately used commercially or for show and display purposes without requiring any further attention or preparation.

DETAILED DESCRIPTION OF THE INVENTION

Figure 1:
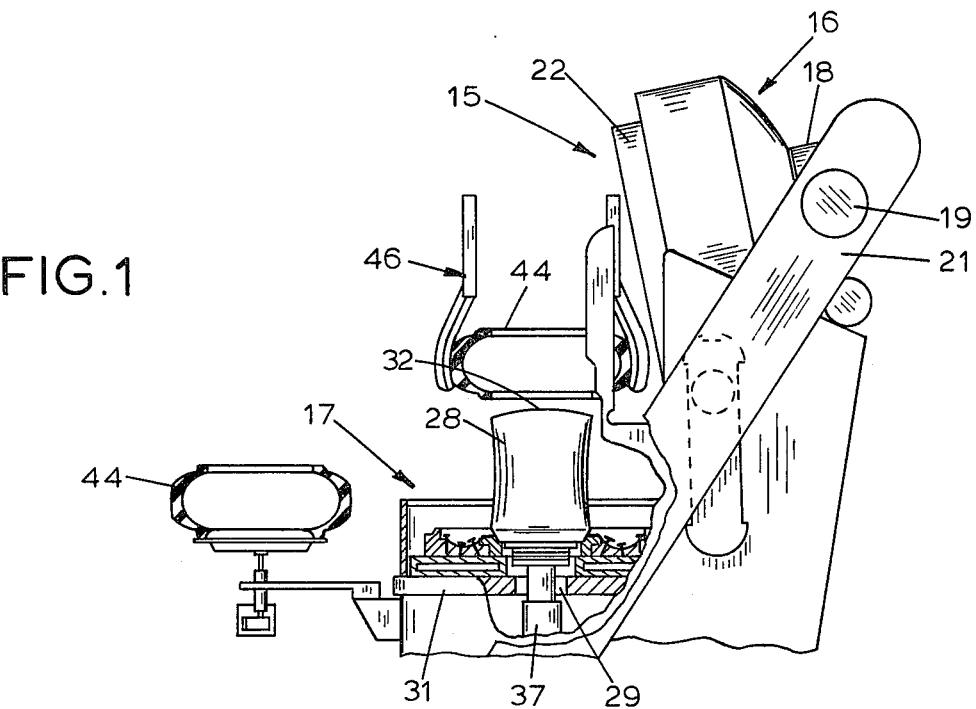
FIG. 1 is a fragmentary side elevation, with parts broken away and other parts shown in section, illustrating the tire mold sections of a tire forming machine in open position to receive a tire band.
Figure 2:
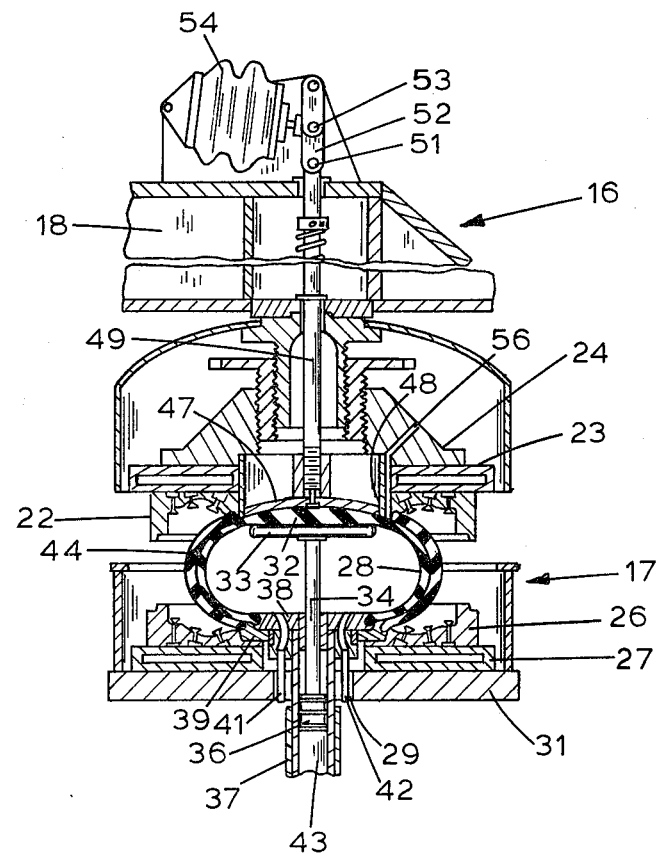
FIG. 2 is a sectional view of the tire forming machine showing the mold sections in partly closed positions and the bladder partially expanded within the tire band.

Referring to FIG. 1 of the drawing, there is illustrated a tire forming or curing machine, indicated generally as 15, and including upper and lower mold assemblies 16 and 17, respectively, wherein the upper mold assembly is movable toward and away from the lower mold assembly to relative closed and open positions, also respectively. The upper mold assembly is secured to the under side of a cross head 18 which extends across the machine and forms part of the operating mechanism for moving the upper mold assembly 16 relative to the lower mold assembly 17. Each end of the cross head 18 has a bearing 19 mounted at the upper end of a corresponding link 21 which are actuated through a motor driven gear system (not shown) to raise and lower the cross head 18. An upper mold member 22, which forms part of the upper mold assembly 16 is secured to the underside of an upper heating platen 23 that is attached to a head member 24 (FIG. 2).

The lower mold assembly 17 (FIG. 2) includes a lower mold member 26 carried on the upper side of a lower heating platen 27. An operating mechanism for a tire shaping diaphragm or bladder 28, located axially of the lower mold member 26, extends through a central opening 29 formed in a base plate 31. The bladder 28 is radially distensible and in a normal non-distended condition is of a generally cylindrical shape, as shown in FIG. 1. The closed upper end or top wall 32 of the bladder has the lower or inner side thereof engageable by an actuating plate 33 which is carried at the free end of a piston rod 34, movable by a floating piston 36 that is reciprocally movable within a cylindrical tube 37 positioned axially of the central opening 29 in the base plate 31. The lower open side of the bladder 28 is closed by a flat plate 38 and a cooperating clamping ring 39. As shown in FIG. 2, the plate 38 slidably receives the piston rod 34 and is formed with passages for connection with fluid lines 41 and 42, hereinafter referred to as pressure and blow down lines, respectively.

On the admission of fluid under pressure into a cylinder 43, the actuating plate 33 engages and raises the closed upper end 32 of the bladder 28 to extend the bladder to its FIG. 1 axially extended position to a height determined by the engagement of the piston 36 with the underside of the plate member 38. With the bladder in an axially extended position and the upper mold assembly 16 in the open position therefor, a partially shaped and uncured tire band 44 (FIG. 1) is arranged concentrically about the bladder and within the lower mold section 17, either manually or by a suitable loading mechanism, indicated generally at 46.

On movement of the upper mold section 22 (FIG. 2) toward a mold closing position therefor, the bladder 28 is initially distended both radially and axially into a conforming relation with the inner surface of the tire band 44. This distention is accomplished by the introduction into the line 41 of what will hereinafter re referred to as a first stage pressure fluid, concurrently with the depressing or lowering of the bladder upper wall 32 by a downward pressure exerted thereon by a pressure piston 47, reciprocally movable in a retaining cylinder 48. A push rod 49 for the pressure piston 47 has its upper end pivotally connected at 51 to a toggle linkage 52 that has a center pivot 53 connected to a pneumatic actuating unit 54 of bellows type.

On extension of the bellows 54, a substantially uniform pressure is applied downwardly on the push rod 49 against the counteracting pressure applied by the floating piston 36 on the piston rod 34. A downward movement of the push rod 49 continues until the toggle linkage 52 reaches its overcenter position shown in FIG. 2, corresponding to a position of the bladder top wall 32 at the lower end of the retining cylinder 49. The relative positions of the bladder top wall 32 and retaining cylinder 48 are maintained on a continued movement of the upper mold member 22 to the closed position therefor, shown in FIG. 3 and thereafter during the tire forming and tire curing periods. As the final shaping operation commences, any air entrapped between the tire band 44 and the bladder 28 is vented to the atmosphere through a series of air bleed passages 56 (FIG. 2).

On completion of the tire curing period, the fluid pressure in the bladder 28 is released and the pneumatic unit 54 is actuated to move the toggle linkage 52 out of its off-center locked position to provide for an upward movement of the push rod 49 and a retraction of the pressure piston 47 within the retaining cylinder 48. On opening of the mold assemblies 16 and 17 the actuating plate 38 is elevated to axially extend the bladder 28 to its position of FIG. 1, permitting removal of the formed tire and the loading of the machine 15 with another tire band 44.

The machine 15 thus far described is of an exemplary type and other type machines can be used in the practice of the present invention. For a more detailed description of the machine 15, shown herein, reference is made to U.S. Pat. No. 3,298,066. In known commercial type tire forming machines, as the final shaping operation commences, any air trapped between the tire band and the tire cavity is expelled to the atmosphere, usually through a plurality of air bleed passages (not shown), circumferentially spaced about the mold members 22 and 26 and extended generally radially and laterally therethrough. Following this expulsion of air, the tire band 44 is permitted to expand within such air bleed passages whereby to form a plurality of rubber pins that, as is well known, project outwardly from the tread and side wall portions of a tire so as to detract from the over-all appearance of the tire. It is the principal object of this invention to eliminate the forming of the usual projecting rubber pins or other surface irregularities in the forming of a tire.

Figure 3:
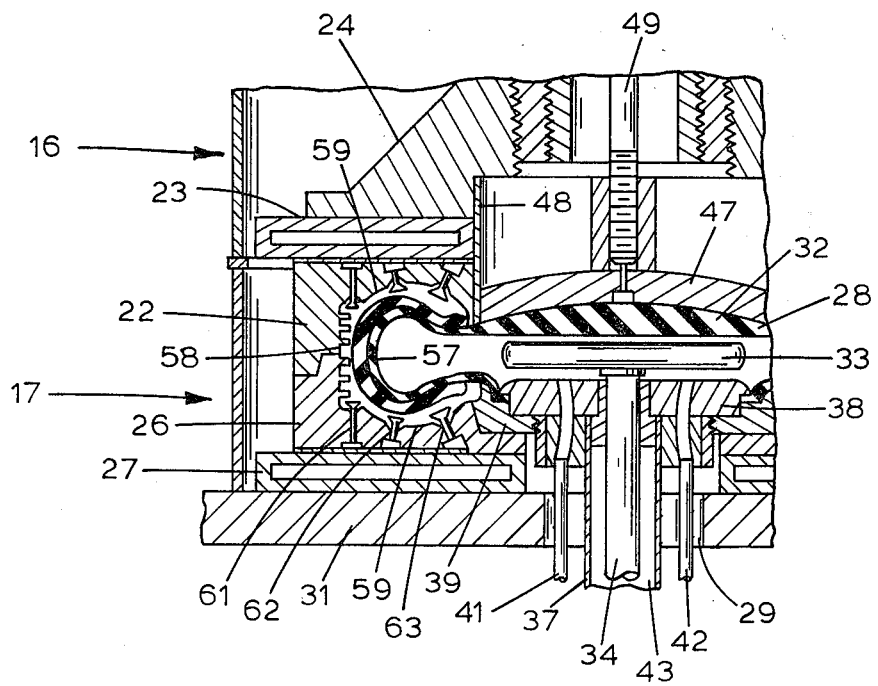
FIG. 3 is a sectional view showing in enlargement a portion of FIG. 2, with the mold section in closed position and the bladder expanded to a first stage wherein the tire band is adjacent to but spaced from the side wall of the tire cavity.
Figure 7:
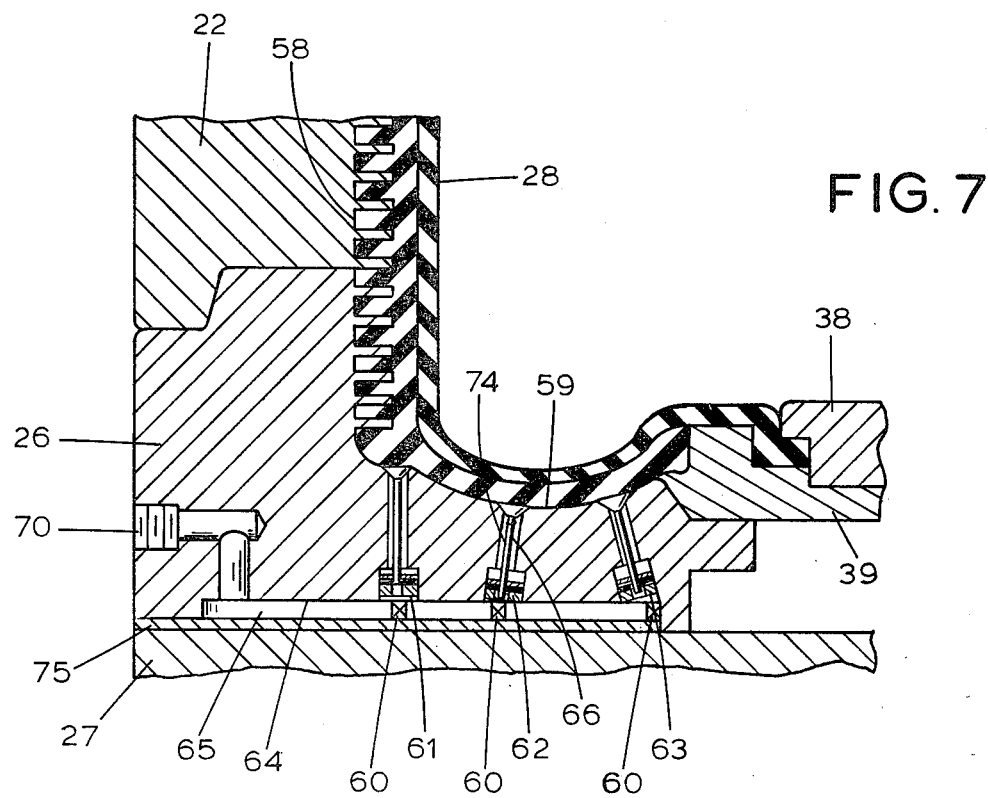
FIG. 7 is illustrated similarly to FIG. 6 and shows the tire in a final forming position with the control valves in changed positions.

As shown in FIGS. 3 and 7, when the upper and lower mold members 22 and 26, respectively, are in their closed positions, a tire cavity 57 is formed between their inner adjacent sides which includes a tread wall section 58 and side wall sections 59. The side wall section 59 of the lower mold member 26 is formed with a series of three rows of air passages 61, 62 and 63 arranged in circles concentrically spaced about the axial center of the mold member 26 and extended laterally therethrough so as to be open to associated annular grooves 60 formed in the surface 64 of the lower mold member. The annular or circular grooves 60 are interconnected by radial grooves 65 formed in the surface 64 and open to the atmosphere at 70. The grooves 60 and 65 are closed by a cover plate 75 to form inner air passages in the bottom surface 64 of the lower mold member 26.

For a purpose to appear later, the passages 61, 62 and 63, in each row thereof (FIGS. 6 and 7) have the axes thereof on radii of that curved portion of the tire cavity side surface 59 in which they are located, it being seen that the curved portions form part of the continuous arcuate surface of the side wall 59. As a result, the passages 61, 62 and 63 in a row are of a different length and inclination laterally of the mold member 26 than the passages of the other two remaining rows due to their relative positions on the curved side wall surface 59 of the tire cavity 57.

Since each passage 61, 62 and 63 is of the same general shape in longitudinal section and is provided with a similarly constructed and operated air control valve unit 66, only a valve unit 66 for a passage 62 will be described in detail with like reference numerals being applied to like parts.

A passage 62 (FIG. 5) has a first elongated section 67 with a terminal end 68 open to the cavity side wall surface 59 and an opposite end 69 open to an annular spring-receiving chamber 71 formed in the lower mold member 26 in axial alignment with the passage section 67. The terminal end 68 of the passage 62 is formed with a valve seat 72 and the junction of the opposite end 69 thereof with the chamber 71 is defined by a shoulder 73. A valve member 74 has a stem 76 extended axially of and within the passage 62 and chamber 71 and a valve head 77 for seating engagement with the seat 72. The valve head is normally held out of a seated engagement with the seat 72 by a coil spring 78 mounted about that portion of the stem 76 within the chamber 71 and arranged in compression between a washer or stop member 79 and a plug 81 threadable within the open end of the chamber 71.

Figure 5:
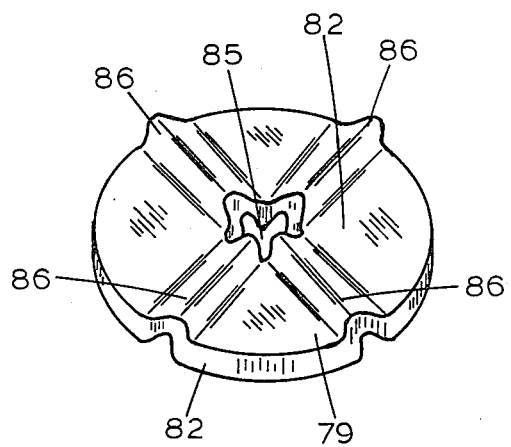
FIG. 5 is a perspective view of a stop member that forms part of the valve in FIG. 4.

The washer 79 is in a press fit engagement on the stem 76 with a side 82 thereof engageable with the shoulder 73. As shown in FIG. 5, the washer has a central opening 85 for receiving the stem 76 and radially extended ribs 86 arranged in a criss cross fashion and projected outwardly from the side 82. The position of the washer axially of the stem 76 is defined by a shoulder 80 swaged in the stem and engageable with the washer 79 such that when the washer is yieldably engaged with the shoulder 73, the valve head 77 is in an open position providing for a free flow of air from the tire cavity 57 into the passage 62.

Figure 4:
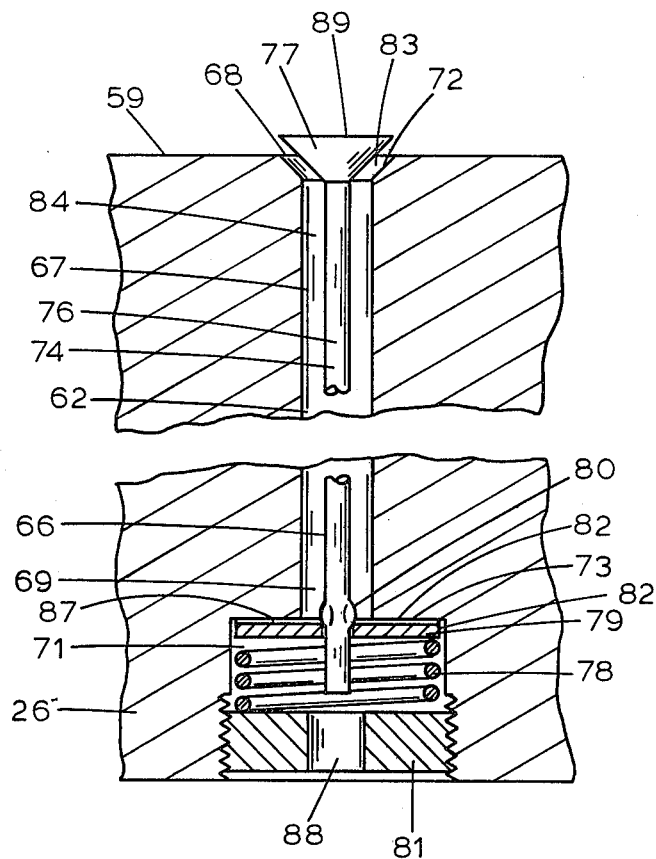
FIG. 4 is an enlarged longitudinal sectional view of an air passage control valve.
Figure 6:
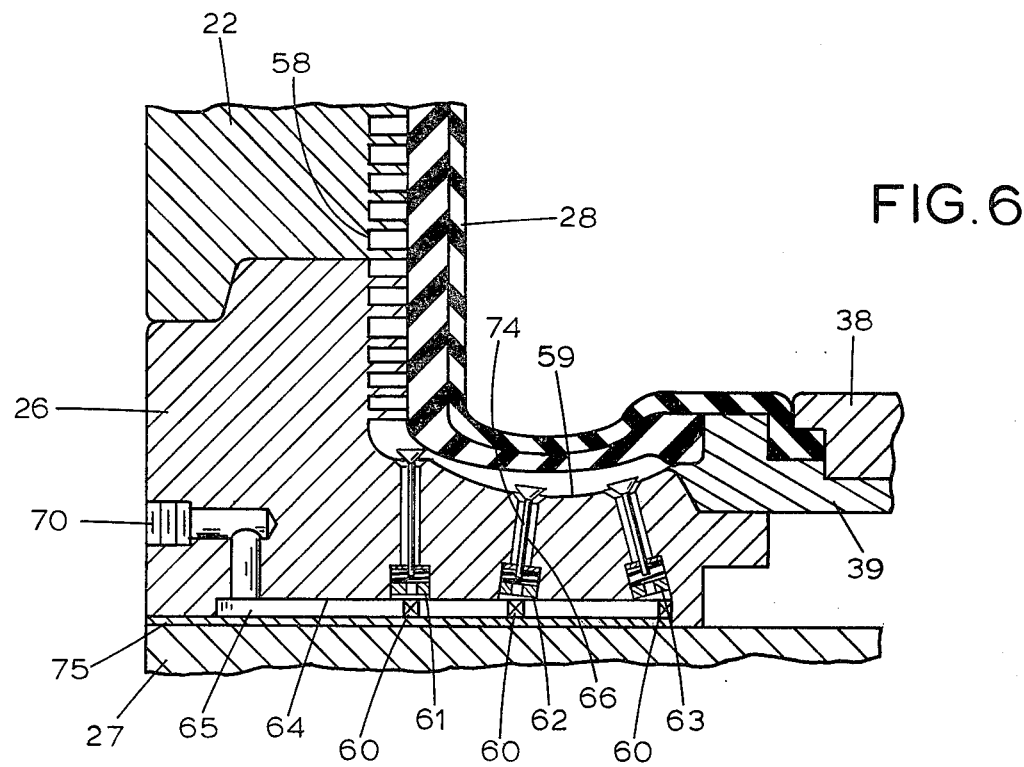
FIG. 6 is an enlarged detailed showing of the air bleed passages and the control valves therefor that are illustrated generally in FIG. 3.

At the open position of the valve member 74, and as seen in FIG. 4, the annular space 83 formed between the valve seat 72 and valve head 77 and the annular space 84 formed between the stem 76 and inner peripheral surface of the passage 62, provide a continuous passage way of substantially uniform cross sectional area open to the tire cavity 57 (FIGS. 4 and 6). With the valve member 74 in an open position, it is seen that air from the tire cavity 57 is permitted to travel freely through the space 83 and 84 and into the air channels or passages 87 formed by the ribs 86 between the shoulder 73 and the side 82 of the washer 79 for flow into the spring chamber 71, and then outwardly therefrom through a central outlet opening 88, formed in the plug 81, for discharge to the atmosphere through the passages 60 and 65.

In one embodiment of the invention, the passage 62 has a diameter of 0.078 inches and the stem 76, a diameter of 0.047 inches. The valve head 77 has a circular top surface 89 with a diameter of 7/64 inches and a seating angle of 45° with the valve seat 72. The spring 78 is of a size and strength to apply a pressure of about 0.035 ounces per square inch. With the washer 79 in engagement with the shoulder 73, the valve head 77 is spaced about 0.020 inches from the side wall surface 59. In this embodiment, the valve member 74 is formed of aluminum and coated with a synergistic coating for improving erosion resistance, hardness and lubricity. This coating is provided by the General Magnaplate Corporation 1331 U.S. Route No. 1, Linden, N.J. 07036, as Nedox 406-plus.

In the use of the machine 15, and with the tire band 44 in a position to be expanded by the bladder 28, the upper mold member 22 is moved to its closing position with the lower mold member 26. Shaping steam at a pressure of about one hundred and eighty pounds per square inch is then admitted into the bladder 28 through the fluid pressure line 41. This steam pressure extends the bladder 28 (FIG. 3) to move or expand the tire band 44 toward conforming engagement with the cavity tread surface 58 and side surfaces 59. During this expansion, the tire band moves air from within the tire cavity 57 through the open valves 74 and into the air passages 61, 62 and 63. As the tire band approaches the cavity side surfaces 59, hot water at a temperature of about 370° F. and a pressure of about three hundred pounds per square inch is admitted into the bladder 28 through the fluid pressure line 41.

Since the valve head surfaces 89 are located about 0.020 inches from the cavity side surface 59, it is seen that the expelling of air from the tire cavity 57 takes place continuously with the valve members 74 in open position, and until the expanding tire band engages the valve head surfaces 89. At such time, the valves are progressively closed to in turn provide for a progressive decrease in the volume rate at which air is discharged from the cavity. The expansion movement of the tire band is at a rate relative to the volume of air being expelled from the tire cavity 57 such that only a small portion of residual air remains in the cavity for discharge through the progressively closing valve members 74. The final shaping of the tire band 52 thus takes place in a substantial vacuum.

The closing of the valve members 74 is by the expanding tire band 44 which functions as a valve actuator. Thus, as the expanding tire band approaches conforming engagement with the cavity side wall surface 59, the valve heads 77 are engaged and moved into seated engagement with the valve seat 72 against the pressure of the coil spring 78. When the expanding tire band 44 reaches conforming engagement with the cavity surface 59, the valves 74 are fully closed, at which time the valve head surfaces 89 form a smooth continuous surface with the tire cavity side surface 59, as shown in FIG. 7. The inclination of the passages 61, 62 and 63 laterally of the mold members 22 and 26 provides for the positioning of the valve head surfaces 89 in conformance with the side wall surfaces 59. As previously noted, the spring pressure acting to yieldably hold the valves 74 in open positions is of a relatively small magnitude so that the valves are closed without the valve heads 77 forming any indentations within the formed tire side wall.

The tire band 44 remains in the final shaping station under the heat and pressure applied by the bladder 38 for a complete tire curing period after which cool water is supplied to the bladder from the fluid pressure line 41. This cooling water is drained from the bladder through the blow down or drain line 42 with the blow down operation taking place concurrently with movement of the upper mold member 22 to its open position. On completion of the blow down operation, the formed tire is manually removed from the machine. Concurrently with such removal, the valves 74 are returned to their open positions by the springs 78.

Although the invention has been described with respect to a preferred embodiment thereof, it is to be understood that it is not to be so limited since changes and modifications can be made therein which are within the full intended scope of this invention as defined by the appended claims.

I claim:
1. The method for forming a tire wherein shaping pressure and heat are applied to a preformed expandable tire band that is centered within a closed tire cavity and that has an outer surface expandable against the inner surface of the side wall of the tire cavity, comprising the steps of:
(a) continuously, without any intermediate stop, expanding the tire band from an initial non-distended condition to a final expanded condition in full conforming engagement with the inner surface of the tire cavity side wall to thereby continuously force all air from the space about the tire band to the atmosphere through air passages in the tire cavity side wall, the air passages having terminal ends in said inner surface thereof,
(b) closing said terminal ends by moving a yieldable valve section to a passage closing position within the terminal end of each passage concurrently with the continuous expanding of the outer surface of the tire band into full conforming engagement with the inner surface of the cavity side wall,
(c) forming said valve section with an end face that is smooth and continuous with the inner surface of the cavity side wall when the valve section is in a passage closing position therefor,
(d) yieldably maintaining each said valve section in an open position away from said inner surface until moved by the outer surface of the continuously expanding tire band to said passage closing position therefor, upon said full conforming engagement, and (e) releasing the expanding pressure on the final expanded tire band and removing the formed tire from the tire cavity whereby each said yieldable valve section moves to the position therefor away from the inner surface to open said terminal ends of the air passages.

2. The method for forming a tire in accordance with claim 1, including the step of:

(a) controlling the rate of the continuous tire band expansion movement relative to the rate of air flow through the air passages so that all of the air in the space about the tire band has been discharged through said passages when the continuously expanding tire band reaches full conforming engagement with the inner surface of the cavity side wall.

* * * * *